(12) United States Patent
Khoo et al.

(10) Patent No.: US 6,721,955 B2
(45) Date of Patent: Apr. 13, 2004

(54) METHOD AND SYSTEM FOR PROVIDING A CUSTOMIZED MEDIA LIST

(75) Inventors: Denis Khoo, Los Angeles, CA (US); Raymond F. Ratcliff, III, Plano, TX (US)

(73) Assignee: Individual Network LLC, West Palm Beach, FL (US)

( * ) Notice: Subject to any disclaimer, the term of this patent is extended or adjusted under 35 U.S.C. 154(b) by 0 days.

(21) Appl. No.: 10/090,439

(22) Filed: Mar. 4, 2002

(65) Prior Publication Data

US 2002/0152465 A1 Oct. 17, 2002

Related U.S. Application Data

(63) Continuation of application No. 09/487,120, filed on Jan. 19, 2000, now Pat. No. 6,434,747.

(51) Int. Cl.[7] .......................... G06F 3/00; G06F 13/00; H04N 5/445
(52) U.S. Cl. .............. 725/46; 725/42; 725/34
(58) Field of Search .............. 725/46, 44, 45, 725/42, 39, 47, 32, 34; 709/224; 345/744, 745; H04N 5/445; G06F 3/00, 13/00

(56) References Cited

U.S. PATENT DOCUMENTS

| 5,621,456 | A |  | 4/1997 | Florin et al. |  |
|---|---|---|---|---|---|
| 5,745,710 | A |  | 4/1998 | Clanton et al. |  |
| 5,758,259 | A |  | 5/1998 | Lawler |  |
| 5,801,747 | A | * | 9/1998 | Bedard | 725/46 |
| 5,848,396 | A |  | 12/1998 | Gerace |  |
| 5,848,397 | A |  | 12/1998 | Marsh et al. |  |
| 5,861,881 | A |  | 1/1999 | Freeman et al. |  |
| 5,861,906 | A | * | 1/1999 | Dunn et al. | 725/87 |
| 6,088,722 | A |  | 7/2000 | Herz et al. |  |
| 6,177,931 | B1 |  | 1/2001 | Alexander et al. |  |
| 6,211,901 | B1 |  | 4/2001 | Imajima et al. |  |
| 6,477,704 | B1 | * | 11/2002 | Cremia | 725/35 |
| 6,526,577 | B1 | * | 2/2003 | Knudson et al. | 725/40 |

* cited by examiner

Primary Examiner—Vivek Srivastava
(74) Attorney, Agent, or Firm—Pillsbury Winthrop LLP

(57) ABSTRACT

A method and system is described for providing a customized media list to a user over a data network. The method comprises providing a personalized data of the user to a computer system, generating a customized media list by the computer system for the user based on the personal data, and providing the customized media list to the user through the computer system where the customized media list represents a customized content and a customized advertising. A system is further disclosed and claimed for providing customized media list to a user over a data network.

14 Claims, 7 Drawing Sheets

METHOD AND SYSTEM FOR PROVIDING A CUSTOMIZED MEDIA LIST

RELATED APPLICATION

This application is a continuation of U.S. Ser. No. 09/487,120, filed Jan. 19, 2000, now U.S. Pat. No. 6,434,747 B1, issued Aug. 13, 2002.

BACKGROUND OF THE INVENTION

1. Field of the Invention

The present invention relates generally to the transmission of broadcast media over a data network, and more particularly to, a method and system for providing a customized media list to a user over that data network.

2. Description of the Related Art

Conventional broadcast media (including visual and audio media over a television) has been provided to viewers and listeners for decades and typically falls under the paradigm illustrated in prior art FIG. 1. Prior art FIG. 1 is a block diagram view of a conventional broadcast media paradigm. In prior art FIG. 1, media 5, includes both content 10 (e.g. television shows, sports, news, weather, movies, concerts, etc.) and advertising 15. The content 10 is provided to the viewer and listener for entertainment or information purposes, while the advertising 15 is typically used to provide revenues for the broadcaster 20. The broadcaster 20 also shares the advertising revenues with the content 10 providers. Thus, from FIG. 1, the broadcaster 20 is the distributor 25 of the content 10 and the advertising 15 to the viewer and listener 30 through a distribution means 35. The distribution means 35 includes public broadcast 40, cable 45 distribution and satellite 50 distribution. In essence, the broadcaster 20 distributes the content 10 and advertising 15 through the distribution means 35 and generally shares the costs of distributing such content 10 and advertising 15 with the viewer and listener 30 through the distribution means 35.

Several disadvantages exist with the paradigm of prior art FIG. 1. These disadvantages are shared by the advertisers of the advertising 15, the broadcasters 20 and the viewer and listener 30. A first disadvantage is that the viewer and listener 30 has few options as to the content 10 and advertising 15 that the viewer and listener 30 may view. That is, such content 10 and advertising 15 has already been scheduled by the distributor 25 and the viewer and listener 30 may only watch (or listen to) such content 10 and advertising 15 that has been scheduled. The viewer and listener's only option is to change the channel on the television or turn off the television. Either option limits the viewing audience for the broadcasters 20, advertisers 15 and content 10 providers.

A second disadvantage is that advertisers can only guess as to the number of the target audiences viewing the content 10. Well known audience estimators only estimate the number or actual viewers and listeners that watch and listen to the content 10 and advertising 15. The advertisers 15 base their targeted audiences on such estimated ratings. Thus, advertisers are paying for advertising that may never reach the full target audience. This is because the advertisement is not reaching 100 percent of the target audience. Also, the current estimate of viewers and listeners only provide a guess on the number of actual viewers and listeners.

A third disadvantage with the paradigm of prior art FIG. 1 is that no one television channel is customized to each viewer and listener. A viewer and listener must therefore search the various contents throughout the television channels which takes time and may result in little or no content and advertising being watched.

A fourth disadvantage is that specific television content 10 is only shown at a specified schedule, which a viewer and listener may not always be available to adhere to. Thus, a viewer is forced to either miss the scheduled content or otherwise must record the content which takes planning and time.

A fifth disadvantage is that the ratings for the audience of a particular content is delayed in the paradigm of prior art FIG. 1. Further, such ratings are imperfect in that only an estimate rather than an actual number of viewers may be given.

A need therefore exists for a method and system for providing media that alleviates many of these disadvantages.

SUMMARY OF THE INVENTION

The present invention provides for a method for providing a customized media list to a user over a data network. The method includes the first step of providing a personalized data of the user to a computer system. Then, the computer system generates a customized media list for the user based on the personalized data and provides the customized media list to the user through the computer system. The customized media list represents a customized content and a customized advertising to the user.

In a further embodiment, the method also includes the step of retrieving, through the computer system, a customized media based on the customized media list. The customized content represents a list of television shows and the customized advertising represents a list of advertising commercials, where the list of television shows and the list of advertising commercials are arranged in a predetermined order.

An additional step, in a still further embodiment, of providing the personalized data includes the step of providing a personal profile of the user that contains data describing the user. This substep includes, in this embodiment, providing a television show preference of the user.

The generating step, in another embodiment, also includes generating, through the computer system, the customized media list based on the personal profile, the television show preference, the past viewing habits and a predetermined list of available television shows of the user.

The step of providing the personalized data to the computer system further includes, in another embodiment, providing the personalized data to a client of the computer system and then transmitting the personalized data to a server of the computer system from the client of the computer system. Then, in a further embodiment, the generating step includes the step of generating the customized media list at the server of the computer system.

The step of providing the customized media list to the user further includes, in a still further embodiment, the steps of transmitting the customized media list from a server to the client of the computer system, then retrieving through the client, a customized media being represented by the customized media list immediately upon receiving the customized media list, where the customized media includes a television show and an advertising commercial. Then the step of providing the customized media list from the client to the user is provided. A further embodiment includes a step of providing an option to the user of modifying the customized media list.

The present invention further provides for a system for providing a customized media list to a user over a data network. This system, in one embodiment, includes a server storage medium for storing an entire content media, an entire advertising media and a personal data of the user. In this embodiment, the system further includes a processor for generating a customized media list from the personalized data, the entire content media and the entire advertising media. A transmitting means for transmitting the customized media list over a data network is also included as part of the system. Also as part of the system is a client processor for retrieving the customized media represented by the customized media list. A client storage media is also provided for storing the customized media list and the customized media transmitted from the service processor. The system further includes a client processor that provides an option to the user of modifying the customized media list. Also as part of this system, in a further embodiment, is a display means for displaying the customized media and customized media list to the user.

In a still further embodiment, the present invention further provides for a system that provides a customized media list to a user over a data network that includes a storage means for storing an entire content media, an entire advertising media and a personalized data of the user. The system further has a server processor means for generating a customized media list from the personalized data, the entire content media and the entire advertising media. A transmitting means for transmitting the customized media list over a data network is provided, as is a client processing means for retrieving the customized media represented by the customized media list. A client storage means for storing the customized media list and the customized media transmitted from the server processor is also provided.

The present invention further provides, in another embodiment, for a computer readable medium having computer instructions stored thereon, so that when the computer instructions are loaded into a computer system, those instructions cause the computer system to perform the steps of providing a personalized data of the user to a computer system, then generating a customized media list by the computer system for the user based on the personalized data. A last step is then performed of providing the customized media list to the user through the computer system where the customized media list represents a customized content and a customized advertising.

The present invention also provides, in a still further embodiment, for an electronic signal having data containing computer instructions that, when loaded into a computer system, causes the computer system to perform the steps of providing a personalized data of the user to a computer system, then generating a customized media list by the computer system for the user based on the personalized data, and then providing the customized media list to the user through the computer system where the customized media list represents a customized content and a customized advertising.

BRIEF DESCRIPTION OF THE DRAWINGS

A more complete appreciation of the invention and many of the advantages thereof will be readily obtained as the same becomes better understood by reference to the detailed description when considered in connection with the accompanying drawings, wherein.

DETAILED DESCRIPTION OF THE PREFERRED EMBODIMENTS

System Overview

Figure 1:
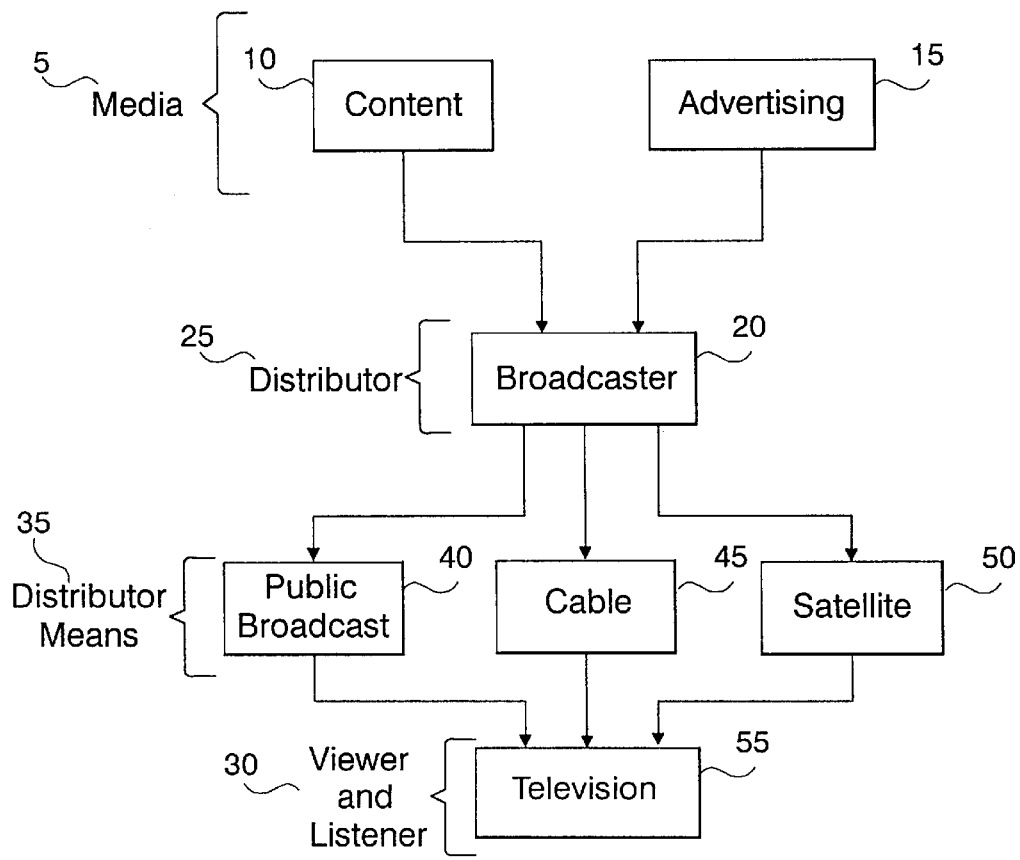
FIG. 1 is a prior art block diagram view of a broadcast media industry paradigm.
Figure 2:
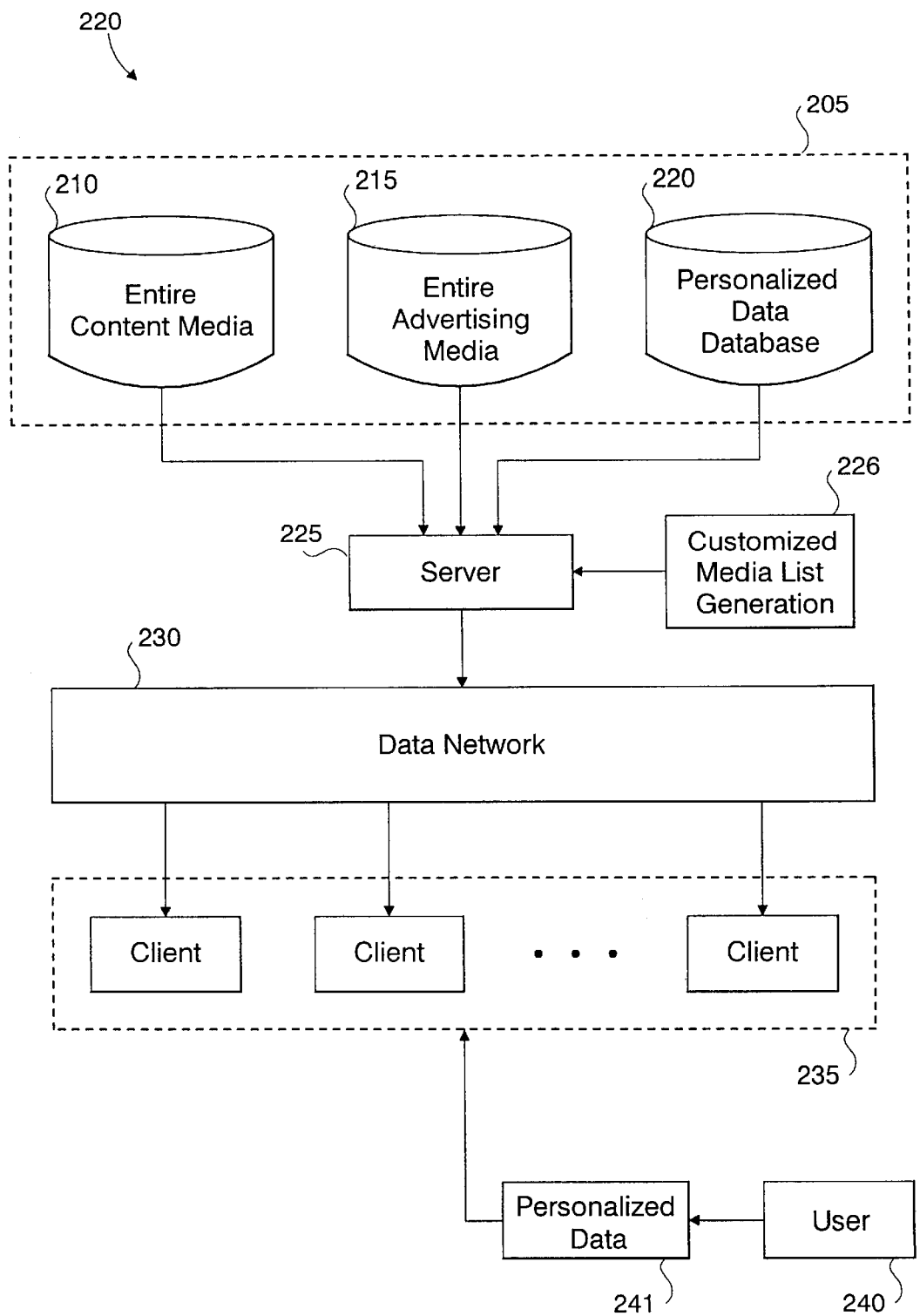
FIG. 2 is a block diagram view of an embodiment of the computer system of the present invention.
Figure 7:
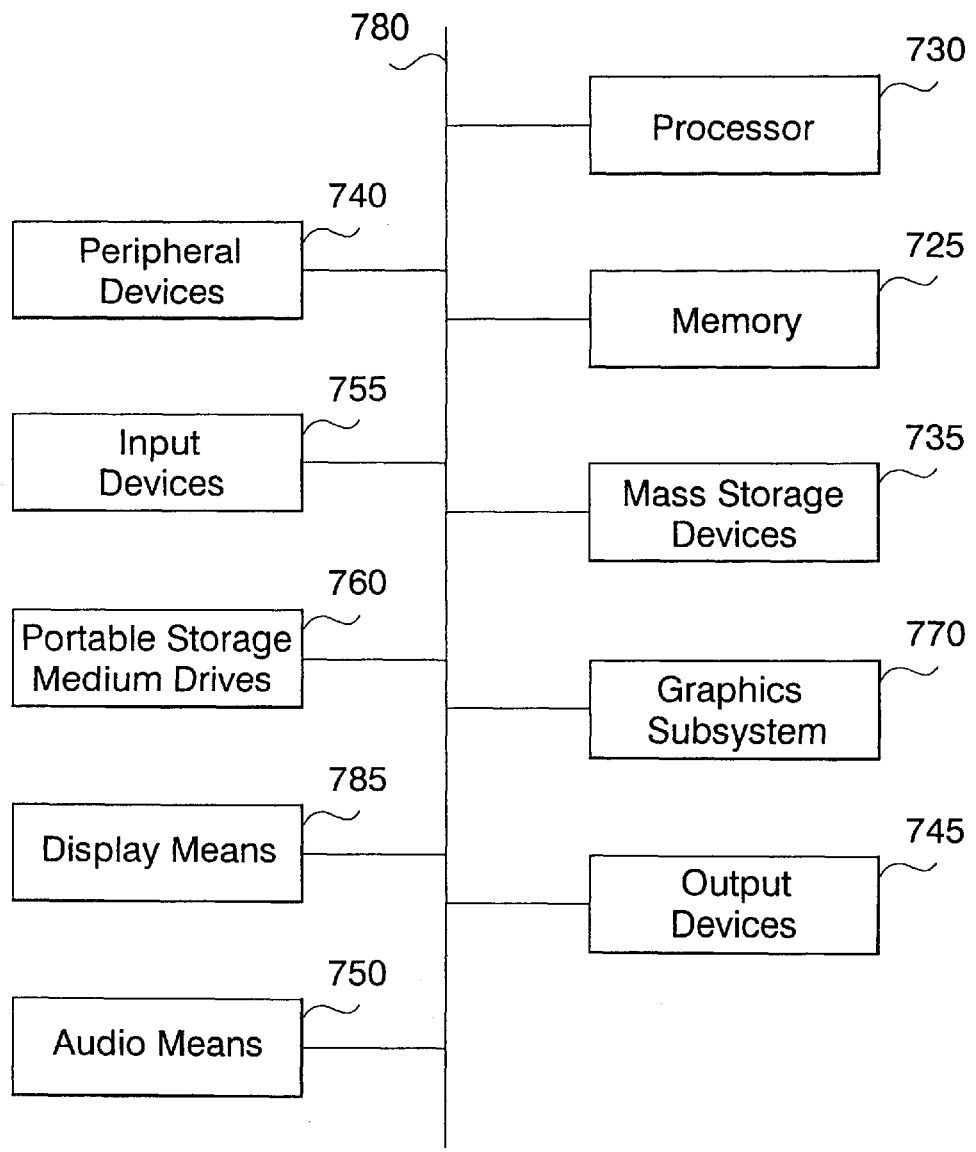
FIG. 7 is a block diagram view of a general purpose computer that may be used to implement an embodiment of the method and system of the present invention.

FIG. 2 is a block diagram view of an embodiment of the computer system of the present invention. In FIG. 2, a computer system 200 is shown having a server storage medium 205. The server storage medium 205 may be any type of storage device as are well known in the art, for example, any type of disc including floppy disc, optical disc, DVD, CD-ROMS, magnetic optical discs, RAM, EPROM, EEPROM, magnetic or optical cards, or any type of storage media that is suitable for storing electronic instructions/data. The server storage medium 205 contains individual databases including an entire content media 210, an entire advertising media 215 and a personalized data database 220 of a user 240. It is noted that the personalized database 220 may also contain personalized data of multiple users. Each of these databases store either content 210, advertising 215 or personalized data 220 for use in the computer system 200 using an embodiment of the method of the present invention as described below. The computer system 200 further includes a server 225, which may have the embodiment of any general purpose computer as shown in FIG. 7 described below. It is noted that the computer system 200, as shown in the embodiment of FIG. 2, shows a server 225 and client 235 as two separate general purpose computers (FIG. 7). However, as is apparent to one skilled in the art, the server 225 and client 235 connected by the data network 230 may, in fact, be a single general purpose computer, where the data network 230 is a bus (FIG. 7) rather than a data network such as the Internet. That is, while the embodiment of FIG. 2 shows the server and client as separate entities, those entities may in fact be one general purpose computer as shown in FIG. 7.

Still in FIG. 2, a data network 230 connects the server 225 and the client 235. The data network 230 may be an Internet, an Intranet, an ethernet-type bus, or any type of connection that is able to transfer data between the server 225 and client 235. In one embodiment, the data network 230 is the Internet, where data is transmitted from different geographical locations where the server 225 and the client 235 are located. The server 225 includes a server processor (not shown), which may be any well-known central processing unit (CPU) or a microprocessor (whether a single microprocessor or a plurality of microprocessors). The server processor, in one embodiment of the present invention, generates a customized media list 226 from personalized data 241 that is entered by the user 240 to the client 235. Thus, as more fully described below, a user 240 will provide personalized data 241 to the client 235. Again, the client 235 is a computer system 200, which may be any general purpose computer as described below in FIG. 7.

After the user provides the personalized data 241 to the client 235, that personalized data 241 is transferred through the data network 230 to the server 225, which is also part of the computer system 200. Once at the server 225, a server processor generates a customized media list 226 from the personalized data by reviewing the entire content media in the content media 210 and the entire advertising media 215 to match the entire content media 210 and the entire advertising media 215 to the personalized data 241 to create a customized media list 226. By match, it is understood that two particular algorithms are provided, within the server 225, in order to provide a customized media list. The match occurs using properties of the content 210 and advertising 215 as described below. A first algorithm, implemented by a personalized content service module (FIG. 3), generates a customized content portion of the customized media list while a second algorithm, a personalized advertising service module (FIG. 3), generates a customized advertising media for the customized media list 226. These algorithms are created using software programming techniques that may be programmed using languages such as Java, C++ or any basic conditional programming language. Any such algorithm would attempt to optimize the entire content media 210 and the entire advertising media 215 that is generated onto the customized media list so as to personalize the content based on the user's 240 preference while minimizing the advertising media 215 based on an optimal profit to the provider of the content media 210.

Once the customized media list 226 is generated by the server 225 using the two algorithms described above, the customized media list is transmitted through the data network 230 by any transmitting means. In one embodiment, the transmitting means would be any means of data communications including modem lines, cable, satellite, DSL, fiber optic lines or other well-known similar means for transmitting data between two remote locations. In a further embodiment, the transmitting means may be the bus described in the general purpose computer of FIG. 7. Furthermore, the client 235 may be a single client, or a single general purpose computer such as the computer of FIG. 7, or may be multiple clients as shown in FIG. 2. A client processor (not shown) retrieves customized media from the entire customized content media 210 that is represented on the customer media list. That is, the client 235 receives the customized media list from the server 225 over the data network 230 and then the client processor may retrieve the customized media, from other locations, based on the customized media list 226. Once at the client 235, the customized media list 226 is stored on a client storage medium that also may store the customized media transmitted from the server processor at the server 225. Again, the client storage medium may be any type of medium as described with regard to the server storage medium and the general purpose computer of FIG. 7.

In a further embodiment, the client processor (not shown) further provides an option to a user 240 of modifying the customized media list 226 received from the server 225. For example, the user may remove or add shows to the customized media list 226, or may rearrange the customized media list 226. It is further understood that the user may modify the customized media list not only to modify the customized media, but also to modify the customized advertising that is part of the customized media list 226. In a still further embodiment, the user may remove customized advertising by paying the content provider a premium fee.

In another embodiment, a display means (not shown) is provided to the user 240 in order to view the customized media list 226 and the customized media. Further, the display means is used to transmit other information such as the personalized data 241 and other information described herein to the user. In a still further embodiment, an audio means is provided whereby the user may listen to the content media and advertising media being transmitted. Both the display means and audio means are implemented using devices described in the general purpose computer of FIG. 7 below.

Figure 3:
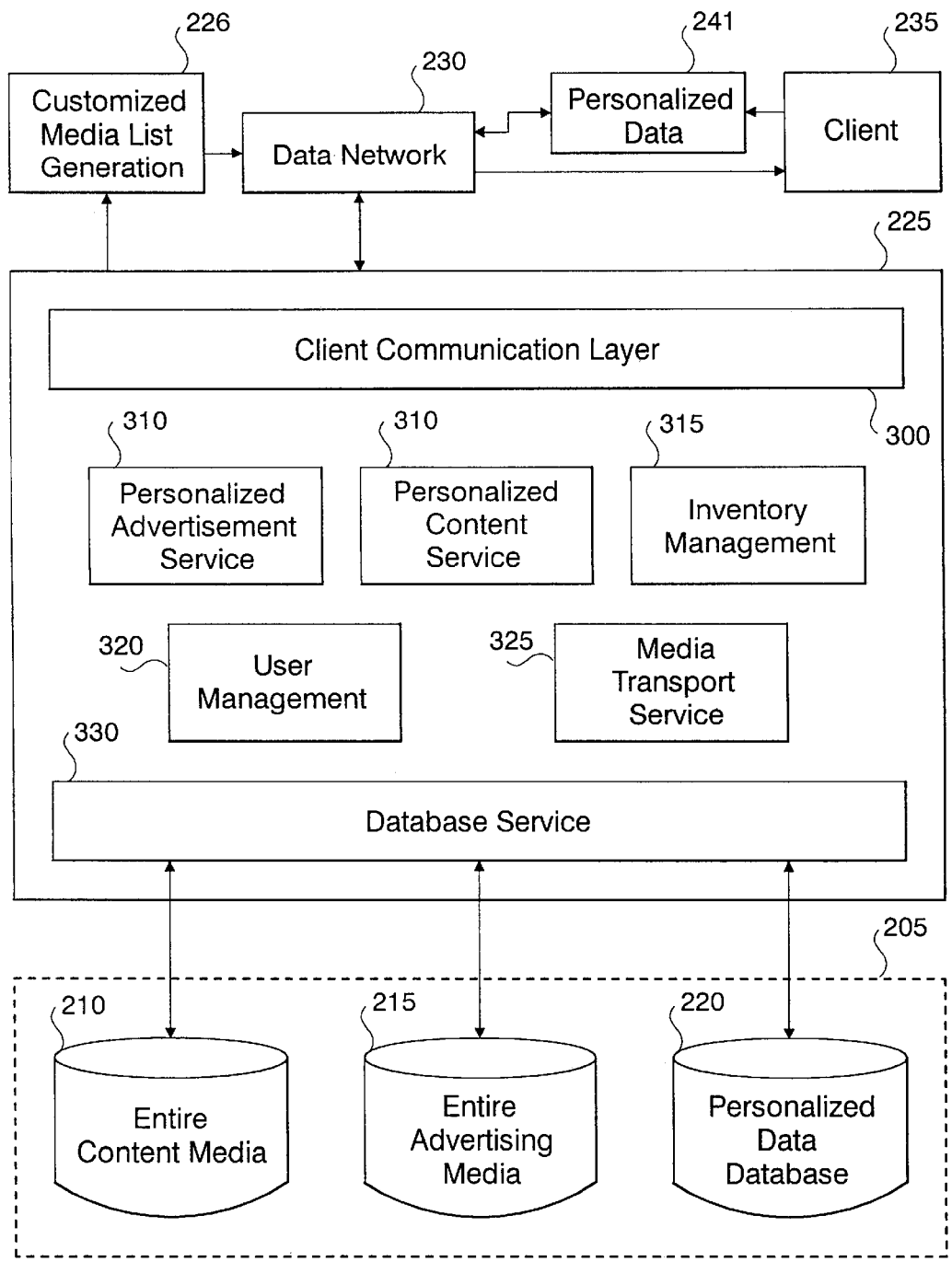
FIG. 3 is a block diagram view of an embodiment of the server of the present invention.

FIG. 3 is a block diagram view of the server 225 shown in FIG. 2. In FIG. 3, various software layers or modules are shown within the server 225. As is well known to one skilled in the art, these layers or modules are implemented in computer code to perform the functions described herein. It is noted that while the server 225 is shown with the layers or modules depicted in FIG. 3, various other hardware and software modules may exist within server 225 including, for example, the server processor, storage means, etc. to make the server a general purpose computer as exemplified in the embodiment shown in FIG. 7.

Still in FIG. 3, the server 225 is in communication with the data network 230 as depicted in FIG. 2. Within the server 225 are multiple software modules and/or layers. A client communication layer 300 manages the manner in which the server 225 communicates with the client 235. The client communications layer 300 is replaceable depending on the type of data network 230 utilized as well as the type of client utilized. Also in the server 225 is a personalized advertisement service module 305. The personalized advertisement service module 305 performs the service of the first algorithm discussed above that matches the advertisement contained in the entire advertising media 215 to the customized content of 210. Likewise, the personalized content service module 310 is the second algorithm described above used to match or optimize the content contained in the entire content media 215 to the users' personalized data. It is noted that these modules are implemented using software programming languages as described above. Also contained on the server 225 is the inventory management module 315. This module 315 works in conjunction with the personalized advertisement service module 305 and the personalized content service module 310 to efficiently provide those services 305 and 310 to a user. That is, the inventory management 315 is shared by the module 305 and 310 for common routines or procedures that are run by the modules 305 and 310. For example, it is anticipated that certain routines or procedures will be reiterated throughout the method of the present invention in providing the customized media list, and therefore, the algorithms of the modules 305 and 310 may use the module 315 to efficiently provide the services of those modules 305 and 310 to the user 240 (FIG. 2).

The user management module 320 is used by the server 235 to receive the personalized data 241 of FIG. 2 and store such information on typical storage mediums. The user management module 320 takes the personalized data that consists of the personal profile of the user, the television show preference of the user and the past viewing habits of the user and stores that data on a storage medium in the server 235. That information is later transmitted to the personalized advertisement service module 305 and the personalized content service module 310 that is later used to generate the customized media list being returned to the user. The media transport service module 325 is also located on the server 235 and performs the function of retrieving the customized media that is based on the customized media list 226. The media transport service module 325 communicates with the entire content media 215 and the entire advertising media 210 to deliver the customized media to the user based on the customized media list 226. It is noted that the server storage medium 205 contains the entire content media 215, the entire advertising media 210 and the personalized data of the user may be physical databases contained within the server or, in a further embodiment, may be databases located throughout remote data networks or remote servers that may be retrieved by the server 235. The database service module 330, much like the client communication layer 300, facilitates the communication between the server storage medium 205 and the modules 305, 310, 315, 320 and 325.

In use, the server 225 receives the personalized data 241 through the data network 230 using the client communication layer 300 to interface with the data network 230 and the client 235. Once the personalized data 241 is received by the server 235, the personalized data 241 is stored in the user management module 320. Thereafter, the personalized data may be retrieved from the user management module 320 to be used by the personalized advertisement service module 305 and the personalized content service module 310, in conjunction with the inventory management module 315, to generate a customized media list 226 based on the personalized data 241. Again, as discussed previously, the personalized data 241 is based on the personal profile of the user, the television show preference of the user and the past viewing habit of the user that is provided by the user to the computer system at a first point in time where the user uses the computer system 200.

After the customized media list 226 is generated by the server 235, the customized media list 226 is transmitted through the data network 230 to the client 235. At the time the customized media list reaches the client 235, the client 235 requests, from the server storage medium 205, through the data network 230 and the client 235, the customized content and customized advertising contained within the entire content media 210 and entire advertising media 215 which is then returned to the client 235. It is noted that in the server storage medium 205, the personalized data database 220 contains the personal profile, television show preference and past viewing habits of the user. The customized content retrieved from the entire content media 215 represents television shows, movies, news, sports, weather, and other content that is not advertising information. The customized advertising contains advertising commercials that are sequenced within the customized content in a predetermined order. The predetermined order is determined by the content itself and the user's personalized data.

To match particular content and advertisements to a user, specific properties of the content and advertisements are stored in the sever storage medium 205 of FIG.3. For example, an advertiser may link certain properties, such as target audience, genre, age of user, income of the user, recreational interests of the user, etc., to particular advertisements and may send those advertisements to a user whose personalized data matches those properties. Again, the match is performed in the modules 305 (for advertisements) and 310 (for content) of FIG. 3 It is noted that these properties may be saved in any database, not only the server storage database 205.

Similarly, content may contain properties saved on a database that describe the content. The properties are, for example, title, genre, actors, length of the content, recommended audience and other properties that describe the content. In a further embodiment, the properties may be embedded in the actual content or advertisement itself. Alternatively, in a still further embodiment, the properties may be embedded in the audio portions of the content or advertisement and any type of speech recognition device may be used to locate those properties in the audio portions of the content or advertisement. In essence, the properties may be placed in any location as long as the properties may be matched with the personalized data of the user.

Figure 4:
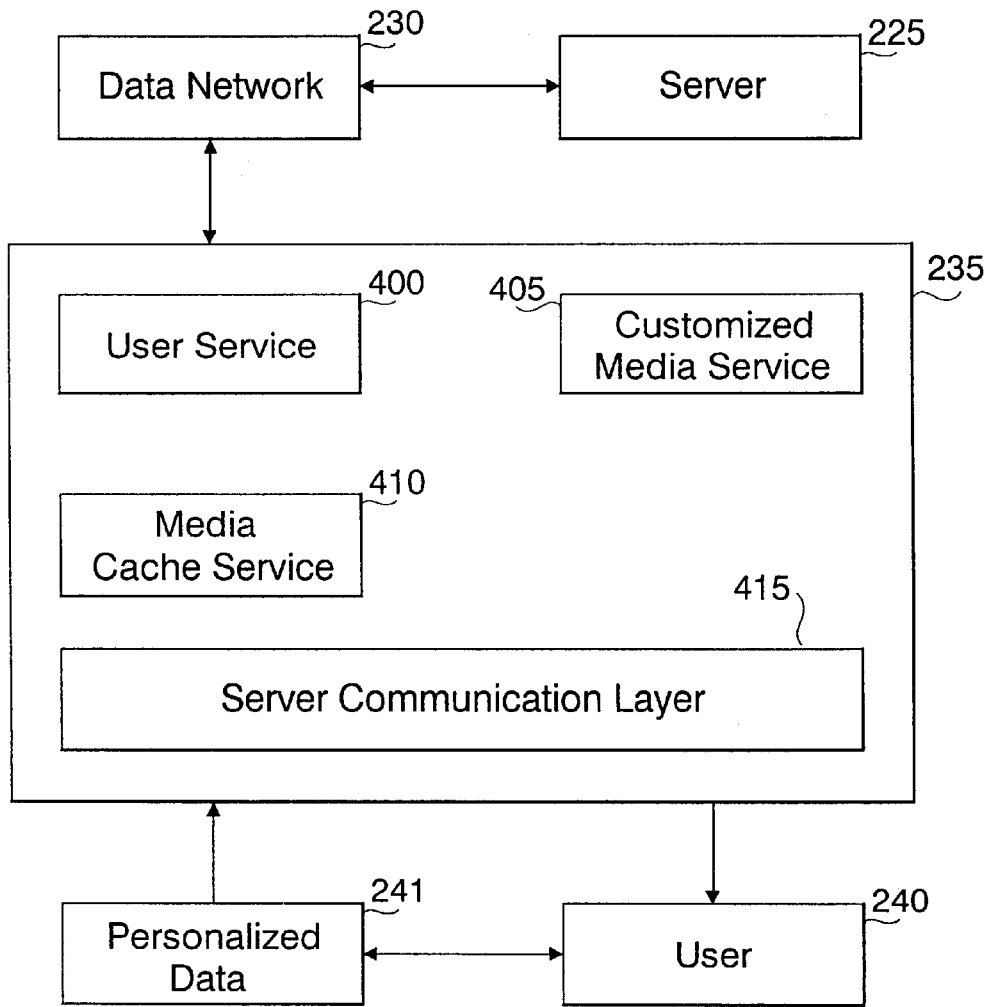
FIG. 4 is a block diagram view of an embodiment of the client of the present invention.

FIG. 4 is a block diagram view of the client 235 of FIG. 2. In FIG. 4, the client 235 is shown with various modules contained therein. Much like the server 225 of FIG. 3, these modules are implemented using software code or other types of computer instructions to implement the functionality of these modules as described below. It is understood that the client 235 may be multiple clients as shown in FIG. 2, may be a single client as shown in FIG. 4 or even be the same as the server 225 as part of one computer system 200. The devices that comprise the client are standard general purpose computer devices as depicted in FIG. 7 below.

In FIG. 4, a user service module 400 is contained within the client 235 and serves to interact with the user 240 to transmit the personalized data 241 from the user 240 to the server 225 in order to generate the customized media list (not shown). The user service module 400 further provides the functions of interfacing with the user to provide preferences to the user on television shows. In essence, the user service 400 is used for all interactions with the user 240 that may be implemented by the computer system of the present invention. Also in client 235 is customized media service module 405 that handles the reception of the customized media from the server 225 through the data network 230. The customized media service module 405 receives the customized media that is based on the customized media list and sends the customized media to the media cache service module 410 that contains a storage medium (not shown) to hold the customized media. Again, the client 235 contains multiple devices for a general purpose computer such as that shown in FIG. 7 below. The server communication layer 415 enables a client 235 to communicate with the data network 230 and the server 225, and is interchangeable with various types of servers and data networks.

In use, the client 235 of FIG. 4 receives the personalized data 241 that provides a personal profile of the user 240 containing data that describes the user 240. This type of data includes information regarding the user 240 such as name, age, income, address, hobbies, hours of television watched per day, profession, and any other type of information that is suitable for purposes of marketing content or advertising to a user 240. The personalized data 241 further includes television show preferences from the user 240 (either by category or particular shows), movies, news, sports or other types of television broadcast. It is noted that the personalized data 241 of the user 240 may also include audio preferences of the user in order to transmit customized media and a customized media list specifically directed to audio preferences of the user. Thus, the present invention as claimed below, is not limited to purely visual content. The preference of a user may include audio preferences, in alternative embodiments.

Returning to FIG. 4, the personalized data 241 is received by the user service module 400 of the client 235 and the interaction between the user 240 and the client 235 is performed by the user service module 400. Thus, a user 240 may receive prompts such as questions asking "please insert your name", "please provide your address", etc. depending on the data described above that is being requested. After the user service module 400 receives that information, that personalized data is transmitted through the data network 230 to the server 225 where the customized media list is generated by the server 225 as described in FIG. 3. The customized media list is then returned from the server 225 through the data network 230 to the client 235 where it is received by the user service module 400 and transmitted to the user 240. Concurrently with receiving the customized media list by the user 240, the customized media is retrieved from the server 225 through the data network 230 from the server storage medium and returned to the customized media service 405 and the client 235 where it is stored in media cache service 410 by a storage medium as described below in FIG. 7.

Methodology

Figure 5:
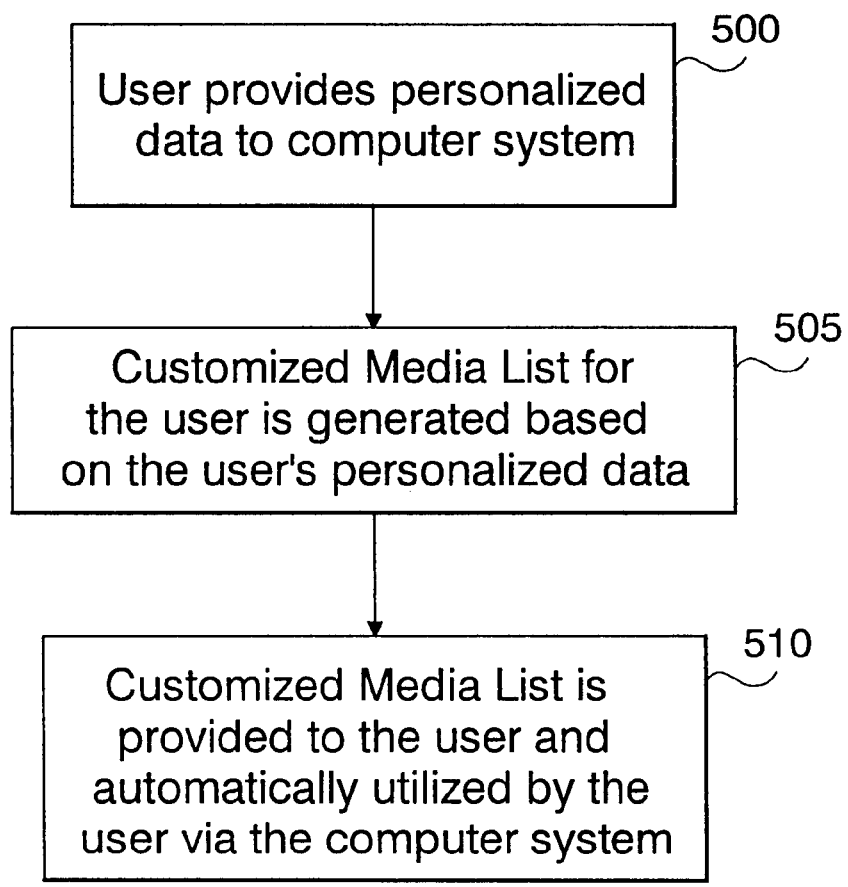
FIG. 5 is a flow chart of an embodiment of the method of the present invention.

FIG. 5 is a flow chart of an embodiment of the method of the present invention. In FIG. 5, a first step 500 begins where a user provides personalized data to a computer system. From FIGS. 2–4, it is described that the user 240 provides personalized data to the computer system 200 that includes the client 235 and the server 225 through a data network 230. The computer system 200 includes the client 235, server 225 and the server storage medium 205, or, in alternative embodiments, separate computer systems contained remotely at the client location and the server location. The user typically provides the personalized data to the computer system through some type of display means (not shown) such as a television set, a personal computer or other type of display means that allows the user to interface with the computer system (FIG. 7). In another embodiment, the user can enter the personalized data through other means that are not visual, such as audio means, or other input devices such as those listed with regard to the general purpose computer of FIG. 7.

Once the user provides the personalized data to the computer system, a customized media list for the user is generated based on the user's personalized data at step 505. At this step 505, the customized media list 226 of FIG. 2 is generated by the server 225 using the personalized advertisement service module 305 and the personalized content service module 310, in conjunction with the inventory management module 315, to generate the customized media list (FIG. 3). As described above, the customized media list is based on the personal profile, the television show preference, the past viewing habits and a predetermined list of available television shows that the user provides as personalized data and is also provided from the entire content media 210 of the service storage medium 205. Again, the customized media list is generated by the modules 305 and 310 of FIG. 3. After the customized media list is generated at step 505, the customized media list is provided to the user and automatically utilized by the user via the computer system. The customized media list represents the customized content contained in the entire content media 210 and the customized advertising contained in the entire advertising media 215. The customized media list is provided to the user through the user service module 400 of the client 235 and instantaneously the customized media service module 405 of the client 235 requests the customized content and the content advertising to be sent to the client and stored in memory using the media cache service module 410.

Comprehensive Example

Figure 6:
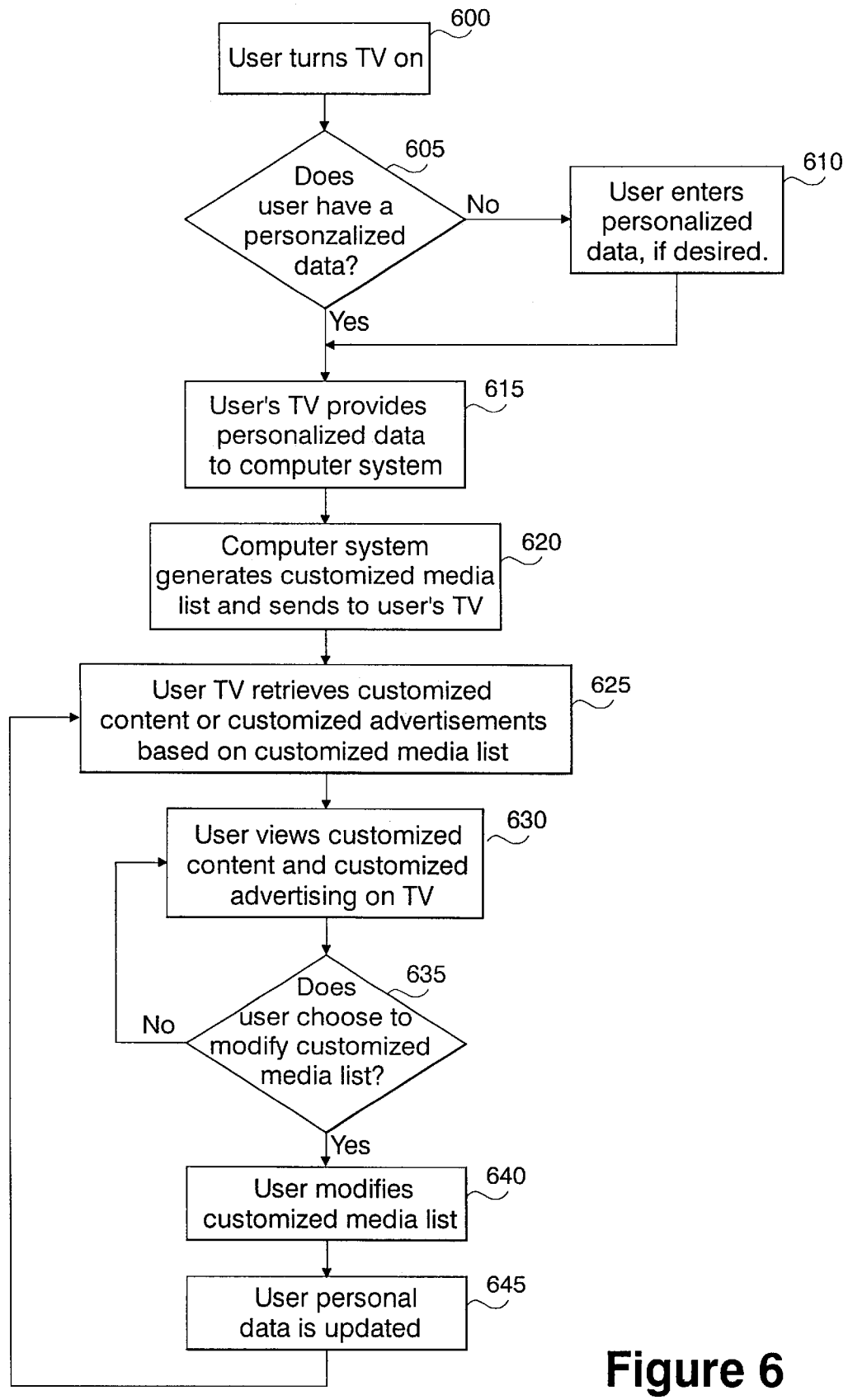
FIG. 6 is a flow chart of an embodiment of the method of the present invention.

FIG. 6 is a flow chart of an embodiment of the method of the present invention. In FIG. 6, the comprehensive example of one embodiment of the methodology and system of the present invention begins at step 600 where a user, such as user 240 of FIGS. 2–4, turns a television on. It is noted that this comprehensive example relates specifically to providing visual content to a user, that is, customized content and customized advertising that is visually received by a user on a television. However, note that the present method and system of the present invention is not limited to visual content or televisions, but is also inclusive of receiving audio or other stimulus through other means visual, audio or otherwise, using the method and system of the present invention as claimed below. Returning to the embodiment of the example of FIG. 6, after turning on the television, the computer system determines whether a personalized data of the user has been set up in the computer system. Note that multiple users may use a common system of the present invention, and therefore the computer system implementing the method and system of the present invention may request to know which user of a particular television, for example, is implementing the method and system of the present invention. Thus, at step 605, the computer system determines whether the user has a personalized data by either asking the user's name or other identification, or if no other users are able to use the system, then the computer system automatically pulls up the personalized data of the user. If the computer system does not have a personalized data of the user, the user enters the personalized data if desired at step 610. After the user enters the personalized data, the television transmits the personalized data to the computer system 200 of FIG. 2 at step 615. If the user does have personalized data already in the computer system, the personalized data is automatically sent to the computer system at step 615 and step 610 is skipped. At step 615, the user has already provided a personal profile of the user, a television show preference and a past viewing habit. This is combined with a predetermined list of television shows that are contained in the entire content media 215 of the server storage medium 205, all shown in FIGS. 2 and 3. At step 615, the personalized data goes from the user's television to the client 235 of FIG. 2 as shown in FIG. 4. Once at the client, the personalized data, which used the user service module 400 to interact with the user, is sent through the server communication layer 415, through the data network 230 and to the server 225 which is shown in FIG. 3. Upon arriving at the server 225, the personalized data 241 goes through the client communication layer 300 and to the user management module 320. The user management module 320 contains logic that stores the personalized data in the personalized data database 220 and further communicates with the personalized advertisement service module 305 and the personalized content service module 310 in order to generate a customized media list, using the inventory management module 315, where the customized media list is based on the personalized data. Again, the customized media list is generated by matching properties of the content and advertisements with the personalized data of the user. When the customized media list is generated by the server 235, the customized media list is sent through the client communication layer 300 through the data network 230 to the client 235 where the customized media list is sent through the server communication layer 415 to the customized media service module 405. Once at the customized media service module 405, the customized media list is sent to the media cache service 410 while simultaneously sent to the user service module 400. At the user service module 400, the customized media list is displayed to the user, in this embodiment, through a television. Simultaneously, when the customized media service module 405 sends the customized media list to the media cache service module 410, the media cache service module 410 interacts with the server communication layer 415 and goes through the data network 230 to the server 225, and through the client communication layer 300, to retrieve the customized content and customized advertising that is contained in the server storage medium 205. The customized content and the customized advertising is then sent back through the server 225, the data network 230 and is cached at the media cache service module 410 of the client 235 on a storage medium. Thus, at this step, the computer system has generated the customized media list and sent that list to the user's television at step 620. Now that the customized media list has been sent to the user at step 620, the television retrieves the customized content and the customized advertising that has been cached in the storage medium through the media cache service module 410 on the client 235 at step 625. Now, at step 630, the user views the customized content and the customized advertising being shown on the television. Next, at step 635, the user is given an option to modify the customized media list. If the user so chooses, the user may customize the media list to add, remove, or otherwise rearrange the customized content on the customized media list at step 640. If the user so chooses to modify the customized media list, the personal data of the user is updated in view of such modification at step 645. If the user does not choose to modify the customized media list, the user the merely views the customized content and customized advertising on the television at step 630.

FIG. 7 illustrates a high-level block diagram of a general purpose computer which is used, in one embodiment, to implement the method and system of the present invention. The general purpose computer, in one embodiment, acts as either the server 225 or client 235 of FIGS. 2–4, or both. The general purpose computer 746 of FIG. 7 includes a processor 730 and memory 725. Processor 730 may contain a single microprocessor, or may contain a plurality of microprocessors, for configuring the computer system as a multi-processor system. In alternative embodiments described above, the processor 730 includes the server processor and client processor of FIGS. 2–4 above. Memory 725, stores, in part, instructions and data for execution by processor 730. If the system of the present invention is wholly or partially implemented in software, including computer instructions, memory 725 stores the executable code when in operation. Memory 725 may include banks of dynamic random access memory (DRAM) as well as high speed cache memory.

The computer of FIG. 7 further includes a mass storage device 735, peripheral device(s) 740, audio means 750, input device(s) 755, portable storage medium drive(s) 760, a graphics subsystem 770 and a display means 785. For purposes of simplicity, the components shown in FIG. 3 are depicted as being connected via a single bus 780 (i.e. transmitting means). However, the components may be connected through one or more data transport means (e.g. Internet, Intranet, etc.). For example, processor 730 and memory 725 may be connected via a local microprocessor bus, and the mass storage device 735, peripheral device(s) 740, portable storage medium drive(s) 760, and graphics subsystem 770 may be connected via one or more input/output (I/O) buses. Mass storage device 735, which is typically implemented with a magnetic disk drive or an optical disk drive, is in one embodiment, a non-volatile storage device for storing data and instructions for use by processor 730. The mass storage device 735 includes the storage medium of embodiments of the present invention, and the server storage medium and client storage medium in alternative embodiments. In another embodiment, mass storage device 735 stores the first and second algorithms of the server in an embodiment of the present invention. The computer instructions that implement the method of the present invention also may be stored in processor 730.

Portable storage medium drive 760 operates in conjunction with a portable non-volatile storage medium, such as a floppy disk, or other computer-readable medium, to input and output data and code to and from the computer system of FIG. 7. In one embodiment, the method of the present invention that is implemented using computer instructions is stored on such a portable medium, and is input to the computer system 746 via the portable storage medium drive 760. Peripheral device(s) 740 may include any type of computer support device, such as an input/output (I/O) interface, to add additional functionality to the computer system 746. For example, peripheral device(s) 740 may include a network interface card for interfacing computer system 746 to a network, a modem, and the like.

Input device(s) 755 provide a portion of a user interface. Input device(s) 755 may include an alpha-numeric keypad for inputting alpha-numeric and other key information, or a pointing device, such as a mouse, a trackball, stylus or cursor direction keys. Such devices provide additional means for interfacing with the customized media list and the customized media in the method of the present invention. In order to display textual and graphical information, the computer 746 of FIG. 7 includes graphics subsystem 770 and display means 785. Display means 785 may include a cathode ray tube (CRT) display, liquid crystal display (LCD), other suitable display devices, or means for displaying, that enables a user to view the customized media list or customized media. Graphics subsystem 770 receives textual and graphical information and processes the information for output to display 785. The display means 785 provides a practical application for providing the customized media list of the present invention since the method of the present invention may be directly and practically implemented through the use of the display means 785. The computer system 746 of FIG. 7 also includes an audio system 750. In one embodiment, audio means 750 includes a sound card that receives audio signals from a microphone that may be found in peripherals 740. In another embodiment, the audio system 750 may be a processor, such as processor 730, that processes sound. Additionally, the computer of FIG. 7 includes output devices 745. Examples of suitable output devices include speakers, printers, and the like.

The devices contained in the computer system of FIG. 7 are those typically found in general purpose computer, and are intended to represent a broad category of such computer components that are well known in the art. The system of FIG. 7 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and the like.

In a further embodiment, the present invention also includes a computer program product which is a computer readable medium (media) having computer instructions stored thereon/in which can be used to program a computer to perform the method of the present invention as shown in FIG. 5. The storage medium can include, but is not limited to, any type of disk including floppy disks, optical disks, DVD, CD ROMs, magnetic optical disks, RAMs, EPROM, EEPROM, magnetic or optical cards, or any type of media suitable for storing electronic instructions.

These same computer instructions may be located in an electronic signal that is transmitted over a data network that performs the method as shown in FIG. 5 when loaded into a computer. The computer instructions are in the form of data being transmitted over a data network. In one embodiment, the method of the present invention is implemented in computer instructions and those computer instructions are transmitted in an electronic signal through cable, satellite or other transmitting means for transmitting the computer instructions in the electronic signals.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems and user applications. Ultimately, such computer readable media further includes software for performing the method of the present invention as described above.

Numerous advantages exist with the method and system of the present invention as claimed below.

First, a user is given many more options as to what content the user wishes to view or listen to than in the past. Rather than going channel by channel on a television or audio receptor, the user is able to specifically personalize the content that it wishes to view at all times. Second, advertisers now have highly personalized data on each user so that the advertising may be directed closely to the particular audience that advertisers wish to attract. Third, a user may, as discussed above with options to the system and method of the present invention, choose to pay additional fees in order to avoid advertising in general. This adds to the entertainment value of the content being watched since advertisements are avoided and time is saved. Fourth, the number of actual users may now be closely monitored rather than relying on audience estimators that can only guess as to the number of actual viewers or users watching or listening. Fifth, with the personal data on the user being known, advertisers may be more confident in the percentage of those users that fit within its target audience, thereby reaching a higher percentage of that target audience than in the past.

Sixth, the user has the advantage now that it may schedule the content that it wishes to view or listen to at the user's leisure rather than on a scheduled programming list as is currently the case.

Although the present invention has been described in detail with respect to certain embodiments and examples, variations and modifications exist which are within the scope of the present invention as defined in the following claims.

What is claimed is:

1. A method for providing customized media to a user, said method comprising the steps of:
    activating a computer system in response to intervention by said user;
    providing data identifying said user to said computer system, said identifying data being correlated with a personal profile of said user;
    generating customized media customized to said personal profile of said user, said customized media comprising customized content with customized advertising integrated therewith, said customized content consisting of television programs, wherein said customized content and said customized advertising are selected from a collection of different content and advertisement options, each of said selections being made in accord with said personal profile of said user; and
    providing said customized media to said user through said computer system for immediate available viewing independent of television program broadcast schedules.

2. The method of claim 1, wherein said content and said advertising commercials are arranged in a predetermined order.

3. The method of claim 1, wherein said step of providing said identifying data comprises the substeps of:
    providing a personal profile of said user, said personal profile containing data describing said user; and
    providing a content preference of said user.

4. The method of claim 3, wherein said generating step further comprises the substeps of:
    generating, by said computer system, a customized media list based on said personal profile, said content preference, a past viewing habit of said user, and a predetermined list of available content.

5. The method of claim 3, wherein said step of providing said personal profile of said user to said computer system further comprises the steps of:
    providing said personal profile to a client of said computer system; and
    transmitting said personal profile to a server of said computer system from said client of said computer system.

6. The method of claim 1, wherein said generating step further comprises the step of generating said customized media at a server of said computer system.

7. The method of claim 1, wherein said step of providing said customized media to said user further comprises the steps of:
    transmitting said customized media from a server to a client of said computer system;
    retrieving, by said client, a customized media immediately upon receiving said customized media; and
    providing said customized media from said client to said user for immediate viewing.

8. The method of claim 1, wherein said television programs comprise a motion picture, cartoon, and/or digitized media.

9. The method of claim 8, wherein said television programs are not programs delivered pursuant to a television broadcast schedule.

10. A system for providing customized media customized to the personal profile of a user, said customized media comprising customized content and customized advertising integrated therewith, said customized content consisting of television programs, said system comprising;
    a device for activating said system in response to intervention by said user;
    a first storage medium for storing a collection of content, a collection of advertisements, and personal profile data of said user;
    a first processor for generating said customized media comprising content and advertisements selected from said collection of content and said collection of advertisements;
    a second processor for retrieving said customized media;
    a second storage medium for storing said customized media; and
    a display means for providing customized media for immediate viewing by the user, said viewing being independent of the time content media in said customized media is otherwise broadcast by a television broadcaster.

11. The system of claim 10, wherein said first storage medium and said second storage medium are the same.

12. The system of claim 10, wherein said first processor and said second processor are the same.

13. The system of claim 10, wherein said first storage medium is a centralized database.

14. A method for providing customized media to a user utilizing a computer system, said method comprising the steps of:

receiving data identifying said user, said identifying data being correlated with a personal profile of said user;

generating customized media, said customized media comprising customized content or customized advertising integrated therewith, said customized content Consisting of programs, wherein said customized content and said customized advertising are selected from a collection of different content and advertisement options, each of said selections being made by said user or in accord with the profile of said user;

providing said customized media to said user through said computer system for immediate available viewing independent of program broadcast schedules.

* * * * *